US011506520B2

(12) United States Patent
Daoud (10) Patent No.: US 11,506,520 B2
(45) Date of Patent: Nov. 22, 2022

(54) SYSTEMS AND METHODS FOR REAL-TIME, NONDESTRUCTIVE MONITORING OF ENERGETIC MATERIALS

(71) Applicant: Raytheon Company, Waltham, MA (US)

(72) Inventor: Sami Daoud, New Hope, PA (US)

(73) Assignee: Raytheon Company, Waltham, MA (US)

( * ) Notice: Subject to any disclaimer, the term of this patent is extended or adjusted under 35 U.S.C. 154(b) by 50 days.

(21) Appl. No.: 16/669,093

(22) Filed: Oct. 30, 2019

(65) Prior Publication Data

US 2021/0131835 A1 May 6, 2021

(51) Int. Cl.
*G01D 5/353* (2006.01)

(52) U.S. Cl.
CPC ..... *G01D 5/35316* (2013.01); *G01D 5/35312* (2013.01); *G01D 5/35332* (2013.01)

(58) Field of Classification Search
CPC ...... G01N 33/22; G01N 33/222; F42B 35/00; F02K 9/96
See application file for complete search history.

(56) References Cited

U.S. PATENT DOCUMENTS

| | | | |
|---|---|---|---|
| 3,937,070 A | 2/1976 | Briar | |
| 5,038,295 A | 8/1991 | Husband et al. | |
| 6,006,163 A | 12/1999 | Lichtenwalner et al. | |
| 6,662,091 B2 | 12/2003 | Wilson et al. | |
| 7,027,953 B2 | 4/2006 | Klein | |
| 7,652,488 B1 | 1/2010 | Lopatin | |
| 7,926,356 B1 | 4/2011 | Lopatin | |
| 8,525,705 B1 | 9/2013 | Lopatin | |
| 2009/0028489 A1 | 1/2009 | Udd et al. | |
| 2009/0192522 A1* | 7/2009 | Blumenkranz | A61B 34/37 606/130 |
| 2011/0018703 A1* | 1/2011 | Tracy | B64G 1/403 340/521 |

(Continued)

FOREIGN PATENT DOCUMENTS

WO     WO 2015/088967 A1     6/2015

OTHER PUBLICATIONS

International Search Report for International Application No. PCT/US2020/048606 dated Nov. 6, 2020, 12 pages.

*Primary Examiner* — Thanh Luu (57) ABSTRACT

An energetic material device is disclosed. The energetic material device can include a casing. The energetic material device can also include an energetic material in a solid state within the casing. In addition, the energetic material device can include an optical sensor encased within the energetic material to sense a condition of the energetic material. An energetic material monitoring system is also disclosed. The energetic material monitoring system can include an energetic material device. The energetic material device can include a casing. The energetic material device can also include an energetic material in a solid state within the casing. In addition, the energetic material device can include an optical sensor encased within the energetic material. The energetic material monitoring system can also include an interrogator in communication with the optical sensor via an optical fiber.

34 Claims, 4 Drawing Sheets

(56) References Cited

U.S. PATENT DOCUMENTS

| | | | | |
|---|---|---|---|---|
| 2011/0042557 A1* | 2/2011 | Mossman | ............ | G01M 3/047 |
| | | | | 250/227.16 |
| 2016/0356758 A1 | 12/2016 | Daoud | | |
| 2017/0067222 A1* | 3/2017 | Bell | ......................... | E02D 5/22 |
| 2018/0156641 A1* | 6/2018 | Wakahara | .............. | G01B 11/18 |
| 2018/0305270 A1* | 10/2018 | Lewtas | .................. | C06B 45/10 |

* cited by examiner

SYSTEMS AND METHODS FOR REAL-TIME, NONDESTRUCTIVE MONITORING OF ENERGETIC MATERIALS

BACKGROUND

Energetic materials are a high-energy class of compounds that store chemical energy. Energetic materials may be single compounds (e.g., trinitrotoluene (TNT)) containing both an oxidizing group (e.g., $NO_2$) and a reducing group, or a mixture of an oxidizer and fuel elements (e.g., gun powder). Upon being subjected to an external stimulus, such as by mechanical, thermal and/or electrical means, energetic materials undergo rapid decomposition with the release of massive amounts of heat, light, sound, pressure, and large volumes of gases. The amount of energy released varies with the properties of these compounds, such as composition, structure, density, heat of formation and decomposition, etc. High-energy materials are classified as explosives, propellants, and pyrotechnics, depending on their molecular, chemical, and compositional properties and applications.

Weapon systems, such as missiles and bombs, often utilize one form of energetic material that is in a solid state (e.g., solid rocket fuel). Fielded and stored weapon systems (e.g., tactical missiles, bombs, etc.), as well as weapon systems in transit, are often exposed to environmental stressors, which over the course of the weapon system life can degrade energetic materials within a weapon system to levels that render the weapon system unreliable from a safety, as well as a performance, perspective. For example, as energetic materials deteriorate, they may undergo dimensional changes and/or cracking that can potentially degrade their stability and cause catastrophic failures of the energetic material, leading to failure of the weapon system, which can cause significant property damage and/or death. Cyclic exposure to temperature and humidity extremes, vibration and shocks, and corrosive atmospheric conditions are common events, which necessitates monitoring of weapon systems. Long-term environmental exposures affect weapon system performance and reliability as component material properties degrade, and this degradation adversely impacts critical performance parameters. These stresses factor into the aging, deterioration, and eventual decommissioning of the weapon systems. The negative reliability impacts associated with long-term aging and deterioration significantly affect the total life cycle cost of fielding these weapons in a high state of readiness, which can adversely impact warfighter readiness.

Currently, weapon system stockpiles and individual weapon system shelf life are monitored through dedicated stockpile reliability programs (SRPs). SRPs are programs dedicated to surveillance and service life assessment (SLA) testing of the aged system and correlating data collected on the health of the aged system to the original data (e.g., lot acceptance and qualification test data) in order to validate service life of the system and assign a conservative minimum service life baseline to the system.

Health of weapon systems is periodically assessed through various types of destructive testing, which is performed on samples of energetic material. Samples are removed from a weapon system by disassembly of the energetic component or subsystem (such as a rocket motor or a warhead) and dissection of the energetic material (propellant or explosive, respectively). Health of the energetic material is determined through various complex and lengthy bench-top analytical tests (e.g., X-ray imaging, X-ray computed tomography (CT), eddy-current, and ultra-sound scanning) to identify the physical condition and chemical composition of the energetic material samples. Chemical and structural weaknesses in the solid energetic material may lead to decommissioning of the weapon system.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Although current weapon system monitoring techniques do provide some useful information regarding the health of energetic materials in weapon systems, there are drawbacks. For example, the current monitoring methodology is destructive, lengthy, expensive, and often requires the destruction of multiple samples from a population. Destructive test methods typically require many experts in specialized fields, and the time it takes to perform destructive tests may take up to a week or even longer, all of which has a significant negative impact on costs. Also, the current monitoring techniques are often impractical to implement in the field and the carbon footprint of the current approach also presents a disadvantage from a safety perspective. Additionally, the current testing methods are merely reactive, instead of proactive, in nature.

Accordingly, an energetic material device is disclosed that can provide continuous, real-time, nondestructive diagnostics and prognostics of its structural health. The energetic material device can include a casing. The energetic material device can also include an energetic material in a solid state within the casing. In addition, the energetic material device can include an optical sensor encased within the energetic material to sense a condition of the energetic material.

An energetic material monitoring system is disclosed that can include an energetic material device. The energetic material device can include a casing. The energetic material device can also include an energetic material in a solid state within the casing. In addition, the energetic material device can include an optical sensor encased within the energetic material. The energetic material monitoring system can also include an interrogator in communication with the optical sensor via an optical fiber.

Figure 1:
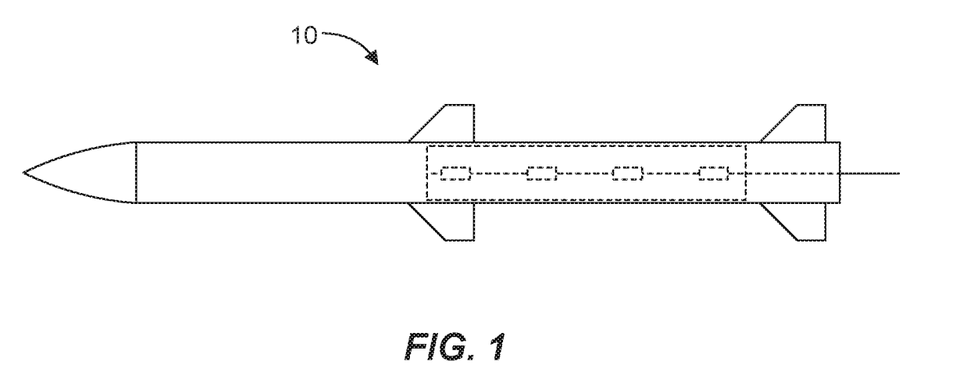
FIG. 1 is a schematic illustration of an energetic material device in accordance with an example of the present disclosure.

To further describe the present technology, examples are now provided with reference to the figures. With reference to FIG. 1, one embodiment of an energetic material device 10 is illustrated. An energetic material portion of the device 10 is shown isolated in FIG. 2 for clarity. In general, the energetic material device 10 includes an energetic material 11 (FIG. 2) in a solid state. The energetic material device 10 of FIG. 1 is illustrated as a rocket or a missile, but an energetic material device as disclosed herein can be or include any device or system that includes energetic material in a solid state, such as an explosive (e.g., a bomb, a demolition charge, a mining charge, etc.). Some such devices may be referred to as "one-shot" devices, or devices that are spent after a single use, such as a propellant-actuated device (PAD), a cartridge-actuated device (CAD), or an electroexplosive device (EED). In some examples, the energetic material device 10 can be a propulsion subsystem, such as a rocket motor (e.g., a solid propellant rocket motor). Thus, in one example, the energetic material 11 can comprise a solid rocket propellant. In another example, the energetic material 11 can comprise an explosive material in a solid state. In a particular example, the energetic material 11 can comprise a composite polymer-based material. In some specific examples, the composite polymer-based material can be a matrix comprising at least one of a binder, a plasticizer, an oxidizer, a burn rate modifier, a stabilizer, an opacifier, or a processing aid.

In one aspect, the energetic material device 10 can include a casing 12 (FIG. 2) or other suitable structure that houses the energetic material 11 such that the energetic material 11 is within the casing 12. As used herein, the term "casing" refers to any structure in contact with, and at least partially forming an outer boundary about, the energetic material 11. In some examples, the casing 12 forms an outer surface or structure of the energetic material device 10. In other examples, the casing 12 is covered by another structure that forms the outer surface of the energetic material device 10. In one example, a casing can include a liner or insert (e.g., a phenolic liner or insert) in contact with the energetic material 11 to form a protective barrier between the energetic material and an outer structural shell. The casing 12 can have any suitable structure and can be made of any suitable material. For example, the casing 12 may be cylindrical in shape and may be constructed of a composite material (e.g., carbon fiber, metal matrix composite, etc.), a polymeric material (e.g., a phenolic material), a cellulose material (e.g., cardboard), a metal material (e.g., titanium, aluminum, steel, etc.), and/or any other suitable casing material.

The energetic material device 10 can also include one or more optical sensors 13a-d (FIG. 2) encased within the energetic material 11 to sense a condition of the energetic material 11. The optical sensors 13a-d can be of any suitable sensor type and can be configured to sense any suitable condition of the energetic material 11. One or more of the optical sensors 13a-d can comprise an optical wavelength filter, a wavelength-specific reflector, and/or any other suitable optical sensor technology. The optical sensors 13a-d can be configured, or utilized, as any suitable type of sensor (e.g., to sense any suitable condition or parameter of the energetic material 11). For example, one or more of the optical sensors 13a-d can comprise a strain gauge, a thermal sensor, an accelerometer, and/or any other suitable sensor type for sensing a condition or parameter of the energetic material 11. In one aspect, at least two of the optical sensors 13a-d can be configured, or utilized, as different sensor types. In one specific non-limiting example, the optical sensors 13a, 13b can be configured, or utilized, as strain gauges, the optical sensor 13c can be configured, or utilized, as a thermal sensor, and the optical sensor 13d can be configured, or utilized, as an accelerometer. In one aspect, the optical sensors 13a-d can be configured for suitable sensitivity, precision, and accuracy in monitoring the energetic material 11. Optical sensors are advantageously utilized as sensors that are embedded within the energetic material 11 due to optical sensors being insensitive to electromagnetic interference (EMI) and electrostatic discharge (ESD), while being rugged, extremely small, and lightweight.

In one aspect, the energetic material device 10 can include an optical fiber 14 (FIG. 2), which can be coupled to or include one or more of the optical sensors 13a-d. For example, one or more of the optical sensors 13a-d can be integrally formed with the optical fiber 14 (e.g., an optical wavelength filter and/or a wavelength-specific reflector can be formed (e.g., inscribed or "written") on an internal wall of the optical fiber 14). In a non-limiting example, the optical fiber 140 can have from 1-32 fiber Bragg grating (FBG) embedded within the energetic material 11, which can be from 1-10 inches apart from one another. Thus, at least a portion of the optical fiber 14 can be encased or embedded within the energetic material 11. The optical fiber 14 can be of any suitable size or construction. In one example, the optical fiber 14 can be micron scale in size (e.g., 150-250 μm in diameter). Similarly, the optical sensors 13a-d can be micron scale in size (e.g., 5-10 μm). In one aspect, the optical fiber 14 can be a high-temperature, polymer-coated, bend-insensitive fiber for optimum performance in low or high temperature environments (e.g., from −60° C. to 300° C.). In another aspect, the optical fiber 14 can be a single-mode fiber, which can provide premium transmission performance in all bands from 1310 to 1625 nm, in a temperature range from −60° C. to 300° C. In one aspect, the optical fiber 14 is chemically compatible with the energetic material 11.

Figure 2:
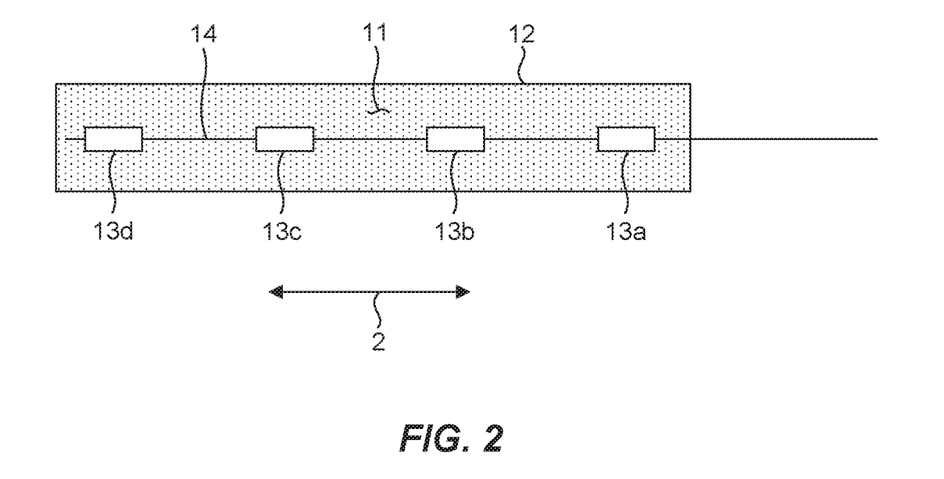
FIG. 2 is a schematic illustration of an energetic material portion of the energetic material device of FIG. 1.

Although only a single optical fiber 14 is shown in FIG. 2, it should be recognized that an energetic material device as disclosed herein can include any suitable number of optical fibers, with each optical fiber including any suitable number of optical sensors. Thus, optical fiber sensing technology can be embedded in the energetic material 11 along only a portion or the entire length or span of the energetic material 11 within the casing 12 of the energetic material device 10. In one aspect, the embedded optical fiber 14 can provide structural reinforcement for the energetic material 11.

In one example, one or more of the optical sensors 13a-d comprises a fiber Bragg grating (FBG), which forms the sensing element. FBGs and their operation and usefulness as optical sensors is well-known in the art, FBGs are micronscale, wavelength-selective mirrors that reflect a single, specific wavelength (referred to as the Bragg wavelength) and allow the rest of the optical signal to pass through. When the optical fiber 14, and therefore the FBG, is deformed (e.g., stretched, compressed, or undergoes thermal expansion and contraction), the Bragg or reflected wavelength changes. A suitable demodulation technique can be employed to observe the change in wavelength and translate this into a measurement of a desired sensed condition (e.g., strain, temperature, acceleration, etc.). In another example, one or more of the optical sensors 13a-d can comprise a Fabry-Perot sensor, which is also well-known in the art as an optical sensor.

In one aspect, optical sensors as disclosed herein can be discrete, individual sensors. For example, a single optical fiber 14 can include multiple discrete, individual, inline FBG sensors 13a-d (e.g., each FBG sensor can be configured or formed to reflect a different Bragg wavelength). Such FBG configurations can be utilized with a wavelength division multiplexing (WDM) demodulation technique, among others. In another aspect, an optical sensor as disclosed herein can be a continuous sensor that extends along substantially an entire length of a zone of interest. For example, an FBG sensor can be configured or formed continuously along a length of the optical fiber 14 that is embedded within the energetic material 11. This optical sensor configuration can be utilized with an optical frequency domain reflectometry (OFDR) (also known as swept laser interferometry). OFDR can be used to determine both what and where events are occurring all along an optical fiber.

The optical sensors 13a-d can be in any suitable arrangement within the casing 12 and the energetic material 11. For example, as shown in FIG. 2, the optical sensors 13a-d can be arranged in a longitudinal direction 2 of the casing 12 (e.g., distributed at different locations along a length of the optical fiber 14) to sense conditions of the energetic material 11 at different longitudinal locations. Other senor arrangements and configurations are disclosed in more detail below. It should be recognized that the energetic material device 10 can include any suitable number, type, and arrangement of optical sensors, in accordance with the principles disclosed herein. In one aspect, the arrangement of optical sensors can be configured to detect and measure multi-directional strain within the energetic material 11, such as strain in the longitudinal direction and in lateral directions orthogonal to the longitudinal direction (i.e., in three dimensions).

Figure 3:
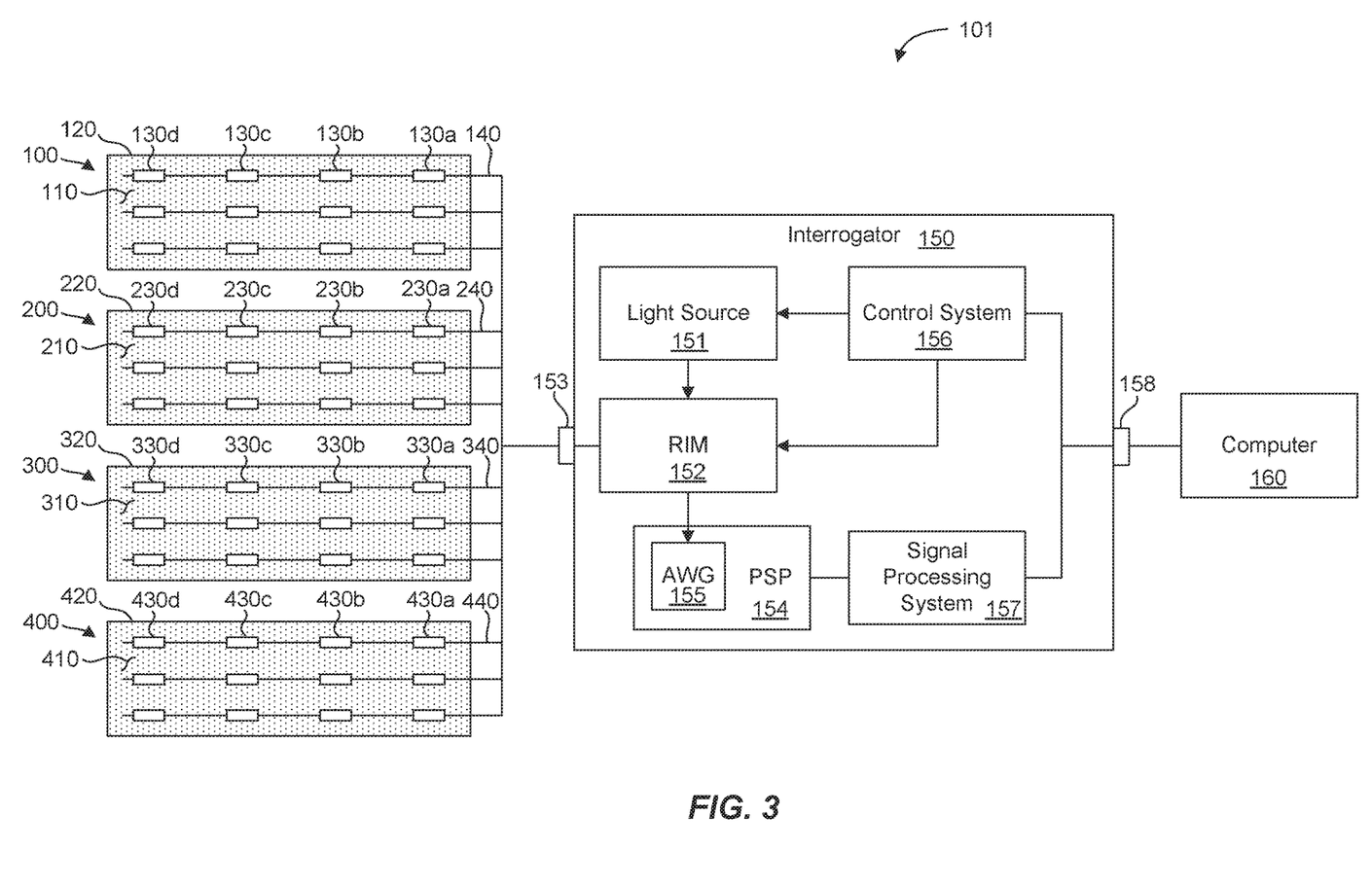
FIG. 3 is a schematic illustration of an energetic material monitoring system in accordance with an example of the present disclosure.

FIG. 3 schematically illustrates an energetic material monitoring system 101, in accordance with an example of the present disclosure. The monitoring system 101 can include one or more energetic material devices 100, 200, 300, 400. The energetic material devices 100, 200, 300, 400 can be similar to the energetic material device 10 as shown in FIGS. 1 and 2 and described above. Thus, each of the energetic material devices 100, 200, 300, 400 can include respective energetic materials 110, 210, 310, 410, casings 120, 220, 320, 420, and one or more optical sensors 130a-d, 230a-d, 330a-d, 440a-d. The optical sensors are shown included in or otherwise associated with respective optical fibers 140, 240, 340, 440. Although each of the energetic material devices 100, 200, 300, 400 is illustrated in FIG. 3 as including multiple optical fibers, for ease of discussion and clarity in the illustration of FIG. 3, only a single optical fiber and its associated optical sensors are identified by reference numbers.

The monitoring system 101 can also include an interrogator 150 in communication with the optical sensors 130a-d, 230a-d, 330a-d, 440a-d. In general, the interrogator 150 is an optoelectronic device that illuminates the optical sensor network and records the optical reflection returned from each optical sensor 130a-d, 230a-d, 330a-d, 440a-d. In some examples, the monitoring system 101 can include a computer or processing unit 160 in communication with the interrogator 150. The computer 160 can receive recorded data from the interrogator 150 and perform further data processing, user interfacing, data transmission, and storage functions, as desired. The interrogator 150 and the computer 160 can be configured for wired (e.g., ethernet cable, USB cable, etc.) and/or wireless (e.g., WiFi signal, cellular signal, Bluetooth, eta) communication with one another. The interrogator 150 and the computer 160 can be on the same local network or remote from one another, in which case the interrogator 150 and the computer 160 can communicate via any suitable network interface, such as via the internet, a cellular network, etc. Data sent to the computer 160 can be saved, archived, and/or analyzed with software such as Catman or EVIDAS.

It should be recognized that the monitoring system 101 is not limited to only a single computer or computational device and may include any number of local and/or remote computers in order to adequately monitor the energetic material devices 100, 200, 300, 400. In one example, a local computer can be utilized to perform certain analytical functions, and a remote computer in communication with the local computer, such as via a network, can perform other functions, such as management and monitoring of a network of interrogators and energetic material devices. In one aspect, the monitoring system 101 may include more than one group or population of energetic material devices and associated interrogators. For example, the monitoring system 101 can include multiple interrogators, each coupled to multiple energetic material devices. Each interrogator and associated energetic material device(s) can be referred to as a monitor group. In some examples, a monitor group can also include a computer. The computer may be local or remote relative to the monitor group and may serve as individual monitor group or multiple monitor groups. Multiple monitor groups, as well as a network of computers, can be in communication with a central computer that manages and monitors the entire monitor system or network. Data acquisition can be set up, monitored, and/or changed via the computer and/or computer network, as desired.

In one aspect, the interrogator 150 can be in communication with the optical sensors 130a-d, 230a-d, 330a-d, 440a-d via an optical fiber. For example, the energetic material devices 100, 200, 300, 400 can include respective optical fibers 140, 240, 340, 440, which are similar to the optical fiber 14 of the energetic material device 10, as discussed above with respect to FIGS. 1 and 2. Thus, in one example, the optical fibers 140, 240, 340, 440 can include the respective optical sensors 130a-d, 230a-d, 330a-d, 440a-d. Each of the optical fibers 140, 240, 340, 440 can be operably coupled to the interrogator 150 to facilitate communication between the interrogator 150 and the optical sensors 130a-d, 230a-d, 330a-d, 440a-d. The interrogator 150 can be operable to transmit an optical light signal of a predetermined wavelength range through the optical fibers 140, 240, 340, 440 and receive reflected optical light from the optical sensors 130a-d, 230a-d, 330a-d, 440a-d. It should be recognized that the optical fibers 140, 240, 340, 440 may each be one continuous, unbroken optical fiber or may include two or more segments of optical fibers coupled together end-to-end for communication between the interrogator 150 and the optical sensors 130a-d, 230a-d, 330a-d, 440a-d.

The interrogator 150 can be of any suitable type or configuration of optical interrogator (also referred to as a measurement unit or data acquisition system). The interrogator 150 can measure a large sensing network including various types of optical sensors 130a-d, 230a-d, 330a-d, 440a-d (e.g., strain, temperature, acceleration, etc.) connected along multiple optical fibers 140, 240, 340, 440, and can acquire data simultaneously and at the same or different sampling rates. During data acquisition, the interrogator 150 can measure the wavelength associated with the light reflected by the optical sensors 130a-d, 230a-d, 330a-d, 440a-d, which can then be converted into engineering units. Although the interrogator 150 is shown connected to four energetic material devices 100, 200, 300, 400, it should be recognized that an interrogator may be connected to any number of energetic material devices, which may depend on the capabilities of a given interrogator. The interrogator 150 can be detached and reused when the energetic material devices 100, 200, 300, 400 go into service, or are discarded.

In some examples, the interrogator 150 can include a light or illumination source 151 (e.g., a laser), a routing and isolation module (RIM) 152 to direct outgoing and incoming light, an optical interface port 153 for connecting to the multiplexed optical sensors 130a-d, 230a-d, 330a-d, 440a-d, sensor-specific front-end modifiers, a parallel-architecture photonic spectral processor (PSP) engine 154 with array waveguide gratings (AWG) 155, a controller or control system 156, micro controllers, a signal processing system 157, and/or a network interface 158 (e.g., a wired and/or a wireless interface).

The light or illumination source 151 can be of any suitable type or configuration. In some examples, the light source 151 can be a broadband light source. In other examples, the light source 151 can be a narrow linewidth, continuously swept light source. Narrow linewidth means that the light source emits roughly a single wavelength at any given instant in time. Continuously swept means that the light source sweeps its output across a given wavelength range. One full sweep across the wavelength range corresponds to one full acquisition of an FBG sensor array along the length of an optical fiber.

The RIM 152 can direct the optical broadband light to one or multiple arrays of optical sensors 130a-d, 230a-d, 330a-d, 440a-d, The transmission path can include suitable isolation to prevent back reflection of light toward the light source 151. This isolation can be achieved with an isolator or a circulator. Routing the light to multiple optical fibers 140, 240, 340, 440 may be accomplished using a passive splitter (no speed limits) or a switch (the switching speed limits the viewing times for FBGs on all fibers). Routing the outgoing light to the optical fibers 140, 240, 340, 440 and the back-reflected light from the optical sensors 130a-d, 230a-d, 330a-d, 440a-d can proceed using a circulator or a passive 2×2 splitter (with source isolator).

The sensor-specific front-ends modifiers can be used as interface sensors for many kinds of analog and digital systems to provide hardware modularity. For example, the sensor-specific front-ends modifiers may include analog signal conditioning circuitry that uses sensitive analog amplifiers, filters, and/or integrated circuits (ICs) for sensors to provide a configurable and flexible electronics functional block to interface a variety of sensors to an antenna, an analog-to-digital converter, or a microcontroller.

The PSP 154 can interact with the light source 151 that sends light to the optical sensors 130a-d, 230a-d, 330a-d, 440a-d, The optical sensors 130a-d, 230a-d, 330a-d, 440a-d reflect light with varying wavelengths depending upon the measurands (e.g., strain, temperature, acceleration, etc.). The PSP 154 can divide the reflected light into multiple channels and send it through a multichannel optoelectronic interface and then on to the signal processing system 157. The PSP 154 processes the returned light, which is converted to electronic signals. The electronic signals can be processed by the signal processing system 157, which can include a post-detection electronics (PDE) subsystem. The output of the PDE subsystem can be interpreted by an algorithmic software subsystem. The signal processing system 157 may be included in the interrogator 150 and/or the computer 160. Similarly, the processed electronic signals can be interpreted by software that is executed onboard the interrogator 150 and/or the computer 160.

The AWG 155 may be the same or similar to those used as wavelength division multiplexers (WDMs). The AWG 155 can be used in interrogation of FBG sensors and micro-ring resonator sensors. The AWG 155 can have a planar integrated waveguide structure. The AWG 155 can include two slab waveguides referred to as "free propagation regions" (FPRs), which confine the optical field perpendicular to the plane of propagation but allow free propagation in the lateral directions. Both FPRs can be connected to an array of single-mode waveguides of specific optical length. On the input side, light is injected into the first FPR via input access waveguides, the diverging beam excites the waveguide array, which guides the light to the second FPR, where beams emitted from each array waveguide interfere constructively, forming a diffraction image on the output facet. The fixed path length difference between adjacent waveguides causes a wavelength-dependent tilt of the output wave-fronts, producing a spectrally dispersed diffraction image, which can be coupled into output access waveguides, or sampled directly using an image sensor for applications in Interrogators.

In one non-limiting example, the AWG 155 can include an array of 800 single-mode, rectangular, buried channel waveguides with core dimensions of 3.5 μm×3.5 μm. The AWG 155 can be arranged in a folded configuration. The refractive index of a $SiO_2$ buffer and cladding can be 1.443 and the core refractive index can be 1.466 (D=0.015) at the central wavelength of 1630 nm. The mode field diameter can equal 4.7 μm. Circular waveguide bends with a fixed radius of 3000 μm, which is the minimal radius at the longest expected wavelength of 1800 nm, can be used to minimize systematic phase errors. The physical path length difference between adjacent waveguides can be 111.2 μm, which corresponds to a grating order of 99 and a free spectral range (FSR) of 16.15 nm.

The controller or control system 156 can provide power within the interrogator 150 and can decode the measured signal from the optical sensors 130a-d, 230a-d, 330a-d, 440a-d. The controller or control system 156 can be configured to handle large memory requirements of software and at the same time reduce the time to program without disturbing the integrity of the circuit. Microcontrollers can provide timing capability for sequencing events within the interrogator 150.

Shifts in the Bragg wavelength can be monitored by any suitable technique, such as utilizing an interferometer, a sloped optical filter, a time division multiplexing (TDM) system, a wavelength division multiplexing (WDM) system, or optical frequency domain reflectometry (OFDR). TDM employs a pulsed broadband light source and identifies different gratings of the same wavelength by the time taken for their return signals to reach a detector (the returns from closer gratings are received before those from more distant ones). In WDM, many gratings can be combined on a single fiber and addressed simultaneously provided each has a different Bragg wavelength. This is achieved by using either a broadband light source and a spectrometer for detection, or an agile, tunable or swept-wavelength light source and photodiode detectors.

In one aspect, the interrogator 150 can continuously transmit a broadband optical light signal (e.g., from the light source 151) of given wavelength ranges through the optical fibers 140, 240, 340, 440 and can receive back the same or slightly altered optical wavelengths, depending on any localized changes in the optical fibers 140, 240, 340, 440 at the optical sensors 130a-d, 230a-d, 330a-d, 440a-d. For example, a broadband light source 151 can send light through the optical fibers 140, 240, 340, 440 to the optical sensors 130a-d, 230a-d, 330a-d, 440a-d. The optical sensors 130a-d, 230a-d, 330a-d, 440a-d reflect light with varying wavelengths depending on the measurands (e.g., strain, temperature, acceleration, etc.). The PSP 154 can then process the returned light, which can then be converted to electrical signals, processed, and interpreted (e.g., converted into engineering units).

In one aspect, wavelengths of the returned light can be monitored for changes (e.g., exceed some threshold delta) that represent a crack formation. In another aspect, wavelengths of the returned light can be converted to strain values and monitored for changes in strain (e.g., exceed some threshold delta) that represent a crack formation. Data can be acquired at any suitable sampling rate (e.g., samples taken at intervals of fractions of a second, seconds, minutes, etc.). Thus, real-time, continuous changes in characteristics of the energetic materials 110, 210, 310, 410 of the respective energetic material devices 100, 200, 300, 400 can be measured with respect to any desired condition or parameter (e.g., temperature, wavelength, strain, acceleration, etc.) to detect, locate, and quantify defects/degradations in the energetic materials 110, 210, 310, 410. These parameters can be used to determine whether structural, physical, and/or chemical changes have occurred in the energetic materials 110, 210, 310, 410. For example, the data can be used to infer the health of the energetic materials 110, 210, 310, 410 in terms of oxidizer particle size agglomeration, recrystallization, plasticizer migration, binder aging and fragmentation, cracks as a result of thermal or dynamic shock, vibration, transportation, ejection or drop, moisture infiltration, oxidative cross linking, and others.

In one example, any structural damage that occurs in one or more of the energetic materials 110, 210, 310, 410 can be compared to the actual normal wavelength and strain data and their corresponding data scans, which can trigger an alert or alarm. A monitoring authority may be notified to sample the energetic material device 100, 200, 300, 400 population for more detailed inspection, which can include radiographic (CT scan or X-ray scan) or other tests to make a thorough investigation in order to institute corrective action. By continuous monitoring of parts or regions of the energetic materials 110, 210, 310, 410 that pose higher failure risks, the optical sensors 130a-d, 230a-d, 330a-d, 440a-d can provide inputs to proactively provide corrective actions and/or preventive measures to ensure safe and reliable hardware.

The structural health of the energetic materials 110, 210, 310, 410 can be measured nondestructively, without ever disassembling the energetic material devices 100, 200, 300, 400 containing the energetic material. Any structural damage can be discovered in-real time without a need to disassemble the energetic material devices 100, 200, 300, 400, dissect the casings 120, 220, 320, 420, and sample the energetic materials 110, 210, 310, 410. Further, the health of the energetic materials 110, 210, 310, 410 can be immediately assessed without waiting for results from bench-top analytical instruments and without having to transport the energetic material devices 100, 200, 300, 400 from anywhere in the world. Results may be accessed instantaneously by through the computer 160.

Figure 4:
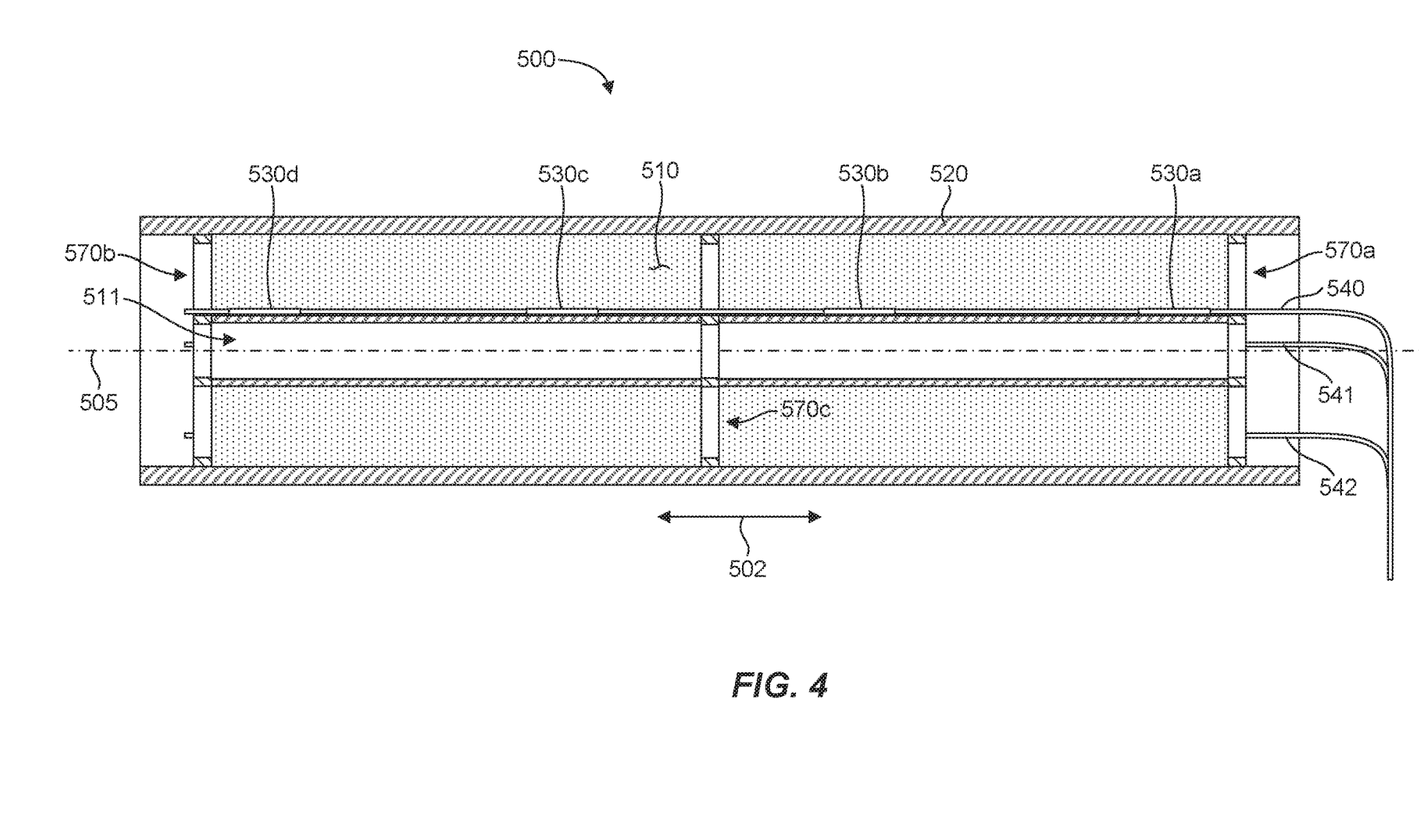
FIG. 4 is a side cross-sectional view of an energetic material device in accordance with an example of the present disclosure.
Figure 5:
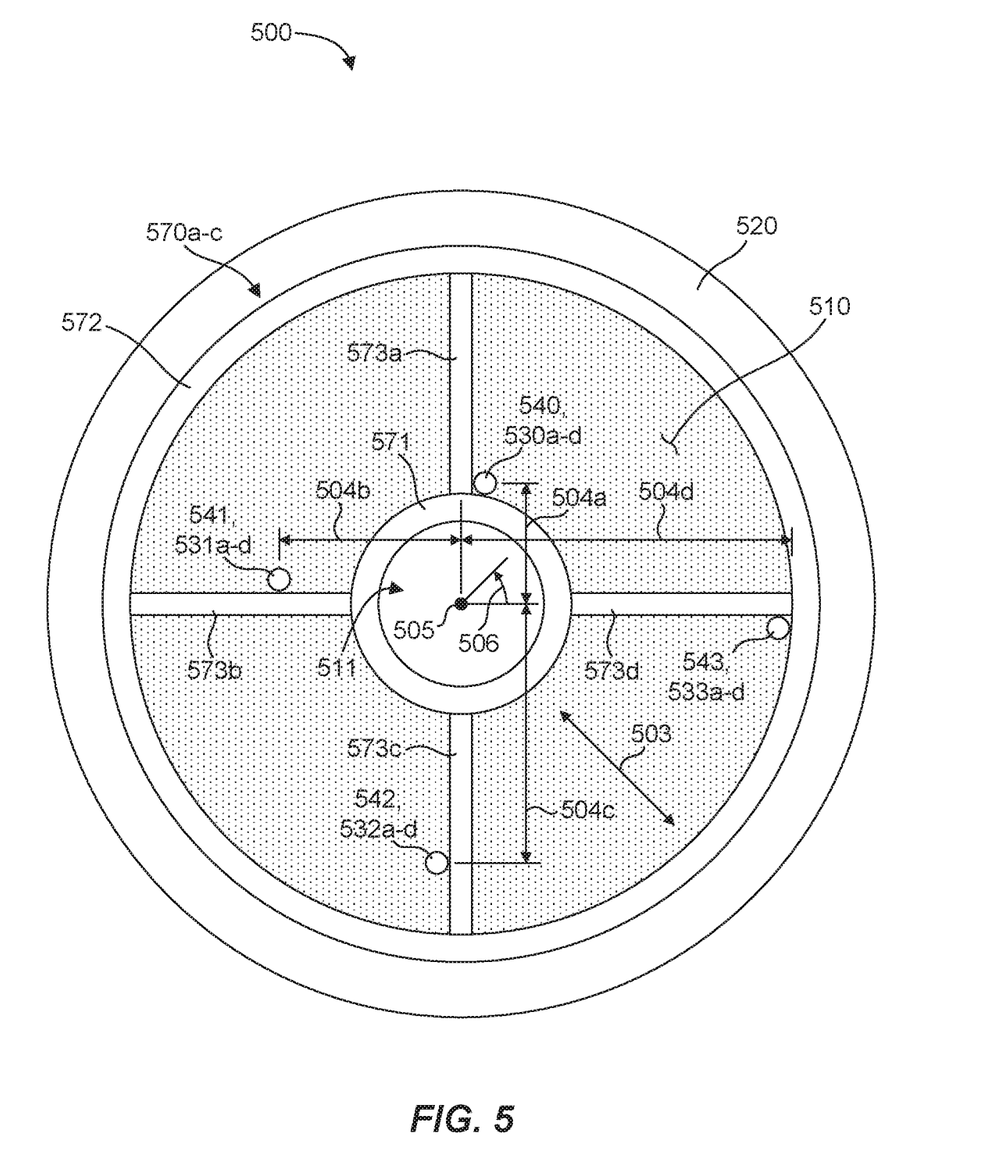
FIG. 5 is an end view of the energetic material device of FIG. 4.

FIGS. 4 and 5 illustrate a cross-sectional side view and an end view, respectively, of an energetic material device 500 in accordance with another example of the present disclosure. The energetic material device 500 is similar to the energetic material devices discussed above in many respects. For example, the energetic material device 500 can include energetic material 510, a casing 520, and one or more optical sensors 530a-d, 531a-d, 532a-d, 533a-d. The energetic material device 500 can also include optical fibers 540-543, which can be coupled to or include one or more of the respective optical sensors 530a-d, 531a-d, 532a-d, 533a-d, In one aspect, the optical fibers 540-543 and their corresponding optical sensors 530a-d, 531a-d, 532a-d, 533a-d can be arranged in a longitudinal direction 502 (FIG. 4) of the casing 520 (e.g., distributed at different locations along a length of the optical fibers 540-543) to sense conditions of the energetic material 510 at different longitudinal locations.

In another aspect, the optical sensors 530a-d, 531a-d, 532a-d, 533a-d can be arranged in a radial direction 503 (FIG. 5) of the casing 520 to sense a condition of the energetic material 510 at different radial locations. For example, as shown in FIG. 5, at least two of the optical fibers 540-543, which can include the respective optical sensors 530a-d, 531a-d, 532a-d, 533a-d, can be arranged at different radial locations within the casing 520 to facilitate sensing of conditions of the energetic material 510 at different radial locations. In other words, the optical fibers 540-543 and the respective optical sensors 530a-d, 531a-d, 532a-d, 533a-d can be at various respective radial positions or distances 504a-d within the energetic material 510 relative to a longitudinal axis 505 of the casing 520. In the example illustrated in FIG. 5, the optical fiber 540 is proximate a bore 511 in the energetic material 510, the optical fiber 543 is proximate the casing 520, and the optical fibers 541, 542 are between the bore 511 and the casing 520. These locations of the optical fibers 540-543 are at different respective radial positions 504a-d relative to the longitudinal axis 505 of the casing 520. In addition, although not required or intended to be limiting, the radial positions 504a-d of the optical fibers 540-543 are evenly spaced radially from the inner surface (i.e., at the bore 511) to the outer surface (i.e., at the casing 520) of the energetic material 510. Any suitable number of optical fibers can be utilized to achieve a desired radial spacing within the energetic material 510. It should be recognized that radial spacing between optical fibers need not be uniform. Additionally, due to its close proximity to the casing 520, the optical fiber 543 may also serve to monitor the structural condition of the casing 520.

In one aspect, the radial positions of two or more of the optical fibers 540-543 can be angularly spaced or offset 506 from one another about the longitudinal axis 505. For example, the optical fibers 540-543 are angularly offset from one another by 90 degrees about the longitudinal axis 505. In other words, the optical fibers 540-543 are at evenly spaced angular positions about the longitudinal axis 505. In the illustrated example, the optical fibers 540-543 are angularly dispersed within different regions (e.g., quadrants) of the energetic material 510. It should be recognized that any suitable angular spacing can be implemented with any suitable number of optical fibers. In one example, eight optical fibers can be evenly spaced at 45 degree increments about the longitudinal axis 505. In another example, 12 optical fibers can be evenly spaced at 30 degree increments about the longitudinal axis 505. It should also be recognized that angular spacing between optical fibers need not be uniform.

Although the optical fibers 540-543 in the example illustrated in FIG. 4 are shown extending linearly, parallel to the longitudinal axis 505, it should be recognized that optical fibers can be curved or follow a curved path to locate associated optical sensors at desired longitudinal, radial, and angular locations within the energetic material. For example, one or more optical fibers can be in a helical configuration or follow a helical path to position optical sensors at various longitudinal and angular locations within the energetic material. In addition, such optical fibers can have various helical diameters to position optical sensors at various radial positions within the energetic material. Additionally, it should be recognized that an optical fiber need not be maintained at a single radial distance from the longitudinal axis 505. Thus, a radial distance between an optical fiber and the longitudinal axis 505 can vary along the longitudinal axis 505, Such a variable radial distance relative to the longitudinal axis 505 can be accomplished with a linear or a curved optical fiber configuration. Therefore, in accordance with the principles disclosed herein, an arrangement of any number of optical fibers can be in any suitable configuration to locate any number of associated optical sensors at any longitudinal, radial, and angular position to facilitate sensing of conditions at any suitable location within the energetic material 510.

In one aspect, the energetic material device 500 can include one or more optical fiber positioning devices 570a-c in support of at least one of the optical fibers 540-543. In particular, the optical fiber positioning devices 570a-c can support the optical fibers 540-543 during assembly to maintain proper positioning of the optical fibers 540-543 (and the optical sensors 530a-d, 531a-d, 532a-d, 533a-d) as liquid energetic material is added to the casing 520 and as the energetic material solidifies into a solid state. The optical fiber positioning devices 570a-c can position the optical fibers 540-543 in a strategic location or arrangement, as discussed above for example, to position the optical sensors 530a-d, 531a-d, 532a-d, 533a-d at desired locations within the energetic material 510. Any suitable number of optical fiber positioning devices 570a-c can be utilized to provide support to position the optical fibers 540-543 in a strategic location or a desired arrangement, as discussed above.

For example, as shown in FIG. 4, two optical fiber positioning devices 570a, 570b can be located at opposite ends of the casing 520 to support the optical fibers 540-543 prior to, during, and after the energetic material has been added to the casing 520. For longer spans, three or more optical fiber positioning devices may be utilized to adequately support the optical fibers 540-543. For example, at least one optical fiber positioning device 570c can be located mid-span between the ends of the casing 520.

The optical fiber positioning devices 570a-c can include any suitable structure or support feature operable to facilitate coupling with an optical fiber and supporting the optical fiber during assembly and manufacture of the energetic material device 500. For example, as shown in FIG. 5, the optical fiber positioning devices 570a-c can include an inner ring 571, an outer ring 572, and one or more struts 573a-d extending between the inner and outer rings 571, 572. The inner ring 571 can be configured with an inner diameter that is substantially the same as a diameter of the bore 511. The outer ring 572 can be configured with an outer diameter that is substantially the same as an inner diameter of the casing 520. Any suitable number of struts can be utilized. In one aspect, the number of struts can be based on the number of angular positions or offsets desired for the optical fibers and associated optical sensors, as discussed above. In the example illustrated in FIGS. 4 and 5, there are four struts 573a-d, which corresponds to four angular offsets, in this case, at 90 degrees apart. Although the struts 573a-d are illustrated as having a straight configuration, it should be recognized that a strut can have any suitable shape or geometry to facilitate positioning and supporting an optical fiber in accordance with the principles disclosed herein.

In one aspect, the optical fiber positioning devices 570a-c can be oriented such that the struts 573a-d of the respective optical fiber positioning devices 570a-c are in alignment with one another. In other words, each optical fiber positioning device 570a-c has the same orientation about the longitudinal axis 505. This can facilitate supporting the optical fibers 540-543 such that the optical fibers 540-543 are in a straight configuration, parallel to the longitudinal axis 505. In another aspect, the optical fiber positioning devices 570a-c can be oriented such that the struts 573a-d of the respective optical fiber positioning devices 570a-c are "clocked" or angularly offset from one another about the longitudinal axis 505. In other words, each optical fiber positioning device 570a-c has a different orientation about the longitudinal axis 505. This can facilitate supporting the optical fibers 540-543 such that the optical fibers 540-543 are in a curved (e.g., helical) configuration.

The optical fiber positioning devices 570a-c can be constructed of any suitable structural material, such as aluminum, steel, titanium, vanadium, composite (e.g., carbon fiber, metal matrix composite, etc.), ceramic, polymeric (e.g., phenolic), etc., alone or in any combination. The optical fibers 540-543 can be coupled or attached to the optical fiber positioning devices 570a-c in any suitable manner, such as with an adhesive, a tie, a ring, a clip, a mounting mechanism or bracket, or others as will be apparent to those skilled in the art.

In accordance with one embodiment of the present invention, a method for facilitating monitoring of an energetic material is disclosed. The method can comprise disposing an optical sensor in a casing. The method can also comprise disposing an energetic material in the casing such that the energetic material at least partially encases the optical sensor. Additionally, the method can comprise facilitating optical communication with the optical sensor. It is noted that no specific order is required in this method, though generally in one embodiment, these method steps can be carried out sequentially.

In one aspect of the method, facilitating optical communication with the optical sensor can comprise obtaining an optical fiber in communication with the optical sensor. In another aspect of the method, the optical fiber can include the optical sensor.

In one aspect, the method can further comprise supporting and positioning the optical fiber in a strategic location. In one aspect of the method, supporting and positioning the optical fiber in a strategic location can comprise disposing an optical fiber positioning device in the casing, and coupling the optical fiber to the optical fiber positioning device. In one aspect of the method, disposing an optical fiber positioning device in the casing can comprise disposing two optical fiber positioning devices at opposite ends of the casing.

In accordance with one embodiment of the present invention, a method for monitoring an energetic material is disclosed. The method can comprise obtaining an energetic material device having a casing, an energetic material in a solid state within the casing, and an optical sensor encased within the energetic material. Additionally, the method can comprise interrogating the optical sensor. It is noted that no specific order is required in this method, though generally in one embodiment, these method steps can be carried out sequentially.

In one aspect of the method, interrogating the optical sensor can comprise transmitting an optical light signal of a predetermined wavelength range through an optical fiber to the optical sensor and receiving reflected optical light from the optical sensor.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An energetic material device, comprising:
   a casing;
   an energetic material in a solid state within the casing;
   an optical sensor encased within the energetic material to sense a condition of the energetic material;
   an optical fiber operable with the optical sensor; and
   an optical fiber positioning device supporting the optical fiber at least partially within the energetic material to maintain positioning of the optical fiber at least partially within the energetic material, wherein at least a portion of the optical fiber positioning device extends radially within the casing, and
   wherein the optical fiber positioning device comprises an inner ring, an outer ring, and one or more struts extending between the inner and outer rings.

2. The energetic material device of claim 1, further comprising a plurality of optical sensors, including the optical sensor, operable with the optical fiber.

3. The energetic material device of claim 2, wherein the plurality of optical sensors are arranged in a longitudinal direction of the casing to sense conditions of the energetic material at different longitudinal locations.

4. The energetic material device of claim 2, wherein the plurality of optical sensors are arranged in a radial direction of the casing to sense a condition of the energetic material at different radial locations.

5. The energetic material device of claim 1, further comprising a plurality of optical fibers, including the optical fiber, and a plurality of optical sensors, including the optical sensor, each of the plurality of optical fibers operable with at least one of the plurality of optical sensors.

6. The energetic material device of claim 5, wherein at least two of the plurality of optical fibers are arranged at different radial locations within the casing to facilitate sensing of conditions of the energetic material at the different radial locations.

7. The energetic material device of claim 5, wherein a first of the plurality of optical fibers is proximate the casing, a second of the plurality of optical fibers is proximate a bore in the energetic material, and a third of the plurality of optical fibers is between the bore and the casing.

8. The energetic material device of claim 5, wherein a first of the plurality of optical fibers is at a first radial position relative to a longitudinal axis of the casing, and a second of the plurality of optical fibers is at a second radial position of the longitudinal axis.

9. The energetic material device of claim 8, wherein the first and second radial positions are angularly offset from one another about the longitudinal axis.

10. The energetic material device of claim 1, further comprising two optical fiber positioning devices, including the optical fiber positioning device, located at opposite ends of the casing.

11. The energetic material device of claim 1, wherein at least a portion of the optical fiber is encased within the energetic material.

12. The energetic material device of claim 1, wherein the optical sensor is integrally formed with the optical fiber.

13. The energetic material device of claim 2, wherein at least two of the plurality of optical sensors are of different sensor types.

14. The energetic material device of claim 1, wherein the optical sensor comprises at least one of an optical wavelength filter or a wavelength-specific reflector.

15. The energetic material device of claim 1, wherein the optical sensor comprises a Fiber Bragg Grating (FBG).

16. The energetic material device of claim 1, wherein the optical sensor comprises at least one of a strain gauge, a thermal sensor, or an accelerometer.

17. The energetic material device of claim 1, wherein the energetic material comprises a solid rocket propellant.

18. The energetic material device of claim 1, wherein the energetic material comprises a composite polymer-based material.

19. The energetic material device of claim 18, wherein the composite polymer-based material is a matrix comprising at least one of a binder, a plasticizer, an oxidizer, a burn rate modifier, a stabilizer, an opacifier, or a processing aid.

20. The energetic material device of claim 1, wherein the inner ring comprises a diameter substantially similar to a diameter of a bore of the energetic material, and wherein the outer ring comprises a diameter substantially similar to an inner diameter of the casing.

21. The energetic material device of claim 1, further comprising a plurality of optical fiber positioning devices, including the optical fiber positioning device, wherein struts of respective optical fiber positioning devices of the plurality of optical fiber positioning devices are circumferentially aligned with one another.

22. The energetic material device of claim 1, further comprising a plurality of optical fiber positioning devices, including the optical fiber positioning device, wherein struts of respective optical fiber positioning devices of the plurality of optical fiber positioning devices are circumferentially offset from one another.

23. An energetic material monitoring system, comprising:
an energetic material device having
a casing,
an energetic material in a solid state within the casing,
an optical sensor encased within the energetic material,
an optical fiber operable with the optical sensor; and
an optical fiber positioning device supporting the optical fiber within the energetic material to maintain positioning of the optical fiber within the energetic material, wherein at least a portion of the optical fiber positioning device extends radially within the casing, and wherein the optical fiber positioning device comprises an inner ring, an outer ring, and one or more struts extending between the inner and outer rings; and
an interrogator in communication with the optical sensor via an optical fiber.

24. The system of claim 23, wherein the interrogator is operable to transmit an optical light signal of a predetermined wavelength range through the optical fiber and receive reflected optical light from the optical sensor.

25. The system of claim 23, further comprising a computer in communication with the interrogator.

26. The system of claim 25, further comprising a communication system operable to facilitate communication between the interrogator and the computer.

27. A method for facilitating monitoring of an energetic material, comprising:
disposing an optical sensor in a casing;
disposing an optical fiber operable with the optical sensor in the casing;
positioning the optical fiber at a strategic location within the casing with an optical fiber positioning device supporting the optical fiber, at least a portion of the optical fiber positioning device extending radially within the casing, and wherein the optical fiber positioning device comprises an inner ring, an outer ring, and one or more struts extending between the inner and outer rings;
disposing an energetic material in the casing such that the energetic material at least partially encases the optical sensor, and maintaining the position of the optical sensor and the optical fiber with the optical fiber positioning device; and
facilitating optical communication with the optical sensor.

28. The method of claim 27, wherein facilitating optical communication with the optical sensor comprises communicatively coupling the optical fiber with an interrogator.

29. The method of claim 28, wherein the optical sensor is integrally formed with the optical fiber.

30. The method of claim 27, further comprising disposing two optical fiber positioning devices, including the optical fiber positioning device, at opposite ends of the casing.

31. A method for monitoring an energetic material, comprising:
obtaining an energetic material device comprising:
a casing,
an energetic material in a solid state within the casing,
an optical sensor encased within the energetic material,
an optical fiber operable with the optical sensor; and
an optical fiber positioning device supporting the optical fiber within the energetic material to maintain positioning of the optical fiber within the energetic material, wherein at least a portion of the optical fiber positioning device extends radially within the casing, and wherein the optical fiber positioning device comprises an inner ring, an outer ring, and one or more struts extending between the inner and outer rings; and
interrogating the optical sensor.

32. The method of claim 31, wherein interrogating the optical sensor comprises transmitting an optical light signal of a predetermined wavelength range through the optical fiber to the optical sensor and receiving reflected optical light from the optical sensor.

33. An energetic material device, comprising:
a casing;
an energetic material in a solid state within the casing;
an optical sensor encased within the energetic material to sense a condition of the energetic material;
an optical fiber operable with the optical sensor;
an optical fiber positioning device supporting the optical fiber at least partially within the energetic material to maintain positioning of the optical fiber at least partially within the energetic material, wherein at least a portion of the optical fiber positioning device extends radially within the casing; and
a plurality of optical fiber positioning devices, including the optical fiber positioning device, wherein struts of respective optical fiber positioning devices of the plurality of optical fiber positioning devices are circumferentially aligned with one another.

34. An energetic material device, comprising:
a casing;
an energetic material in a solid state within the casing;
an optical sensor encased within the energetic material to sense a condition of the energetic material;
an optical fiber operable with the optical sensor;
an optical fiber positioning device supporting the optical fiber at least partially within the energetic material to maintain positioning of the optical fiber at least partially within the energetic material, wherein at least a portion of the optical fiber positioning device extends radially within the casing; and
a plurality of optical fiber positioning devices, including the optical fiber positioning device, wherein struts of respective optical fiber positioning devices of the plurality of optical fiber positioning devices are circumferentially offset from one another.

\* \* \* \* \*